(12) United States Patent
Martelius et al.

(10) Patent No.: US 9,557,489 B2
(45) Date of Patent: Jan. 31, 2017

(54) OPTOELECTRONIC COMPONENT

(71) Applicant: OPTOSKAND AB, Mölndal (SE)

(72) Inventors: Jasper Martelius, Göteborg (SE); Simon Aleryd, Göteborg (SE)

(73) Assignee: OPTOSKAND AB, Mölndal (SE)

( * ) Notice: Subject to any disclaimer, the term of this patent is extended or adjusted under 35 U.S.C. 154(b) by 0 days.

(21) Appl. No.: 14/786,050

(22) PCT Filed: Feb. 18, 2014

(86) PCT No.: PCT/SE2014/050196
§ 371 (c)(1),
(2) Date: Oct. 21, 2015

(87) PCT Pub. No.: WO2014/182212
PCT Pub. Date: Nov. 13, 2014

(65) Prior Publication Data
US 2016/0070071 A1    Mar. 10, 2016

(30) Foreign Application Priority Data

May 8, 2013  (SE) ...................... 1330049

(51) Int. Cl.
*G02B 6/32* (2006.01)
*G02B 6/36* (2006.01)
(Continued)

(52) U.S. Cl.
CPC ............ *G02B 6/3656* (2013.01); *G02B 6/262* (2013.01); *G02B 6/32* (2013.01); *G02B 6/3512* (2013.01);
(Continued)

(58) Field of Classification Search
None
See application file for complete search history.

(56) References Cited

U.S. PATENT DOCUMENTS 4,886,337 A * 12/1989 Raagaard ............ G02B 6/4226
                                                          385/15
5,351,330 A   9/1994 Jongewaard
(Continued)

FOREIGN PATENT DOCUMENTS

DE    10044568 A1    3/2002
JP    2012145913 A   8/2012
WO    WO-93/23800 A1 11/1993

OTHER PUBLICATIONS

PCT/ISA/210—International Search Report—May 26, 2014 (Issued in Application No. PCT/SE2014/050196).
(Continued)

*Primary Examiner* — Hemang Sanghavi
(74) *Attorney, Agent, or Firm* — Venable, LLP

(57) ABSTRACT

An optoelectronic component for receiving light. A housing including an axially extending cavity is arranged to receive an incoming beam. At least one adjustable arrangement includes at least one lens and a first adjustment module configured to adjust a focal point of the lens relative to an end surface of an optical fiber connectable to the housing. A first body is arranged to influence a position of the lens. A second body contacting the first body is journalled in the housing. The first adjustment module is arranged to act on the first body to rotate the first body spherically around a distant point and to alter the position of the lens, in order to locate a focal point of the lens on an end surface of the optical fiber.

14 Claims, 5 Drawing Sheets

(51) Int. Cl.
G02B 6/42 (2006.01)
G02B 7/02 (2006.01)
G02B 27/62 (2006.01)
G02B 6/26 (2006.01)
G02B 6/35 (2006.01)

(52) U.S. Cl.
CPC ............ G02B 6/4226 (2013.01); G02B 7/023 (2013.01); G02B 27/62 (2013.01)

(56) References Cited

U.S. PATENT DOCUMENTS

| | | | |
|---|---|---|---|
| 8,913,861 B2* | 12/2014 | Grapov | G02B 6/4228 385/33 |
| 2003/0095755 A1 | 5/2003 | Vaganov et al. | |
| 2003/0123808 A1 | 7/2003 | Smith et al. | |
| 2005/0147347 A1* | 7/2005 | Fluck | G02B 6/327 385/33 |
| 2010/0254655 A1* | 10/2010 | Bergann | G02B 6/32 385/33 |
| 2012/0195551 A1* | 8/2012 | Pezeshki | G02B 6/4204 385/33 |
| 2014/0241665 A1* | 8/2014 | Beresnev | G02B 27/30 385/33 |

OTHER PUBLICATIONS

PCT/IPER/409—International Preliminary Report on Patentability—Jul. 24, 2015 (Issued in Application No. PCT/SE2014/050196).

* cited by examiner

OPTOELECTRONIC COMPONENT

CROSS-REFERENCE TO RELATED APPLICATIONS

The application claims priority to Swedish patent application 1330049-6 filed 8 May 2013 and is the national phase under 35 U.S.C. §371 of PCT/SE2014/050196 filed 18 Feb. 2014.

TECHNICAL FIELD

The present invention relates to an optoelectronic component provided with means for adjusting the focal point of a lens relative to the end surface of an optical fiber connectable to the component.

BACKGROUND ART

It is often necessary to align an optical fiber with another optical fiber, using for instance an optoelectronic device such as a fiber coupler, or a switch. This can involve either carefully aligning the fiber and placing it in contact with the device, or using a lens to allow coupling and alignment over an air gap.

In a laboratory environment, light is coupled into the bare fiber end using a fiber launch system, which uses an objective lens to focus the light down to a fine point. A precision translation stage (micro-positioning table) is used to move the lens, fiber, or device to allow the coupling efficiency to be optimized. However, this arrangement is not suitable for practical use with high power lasers.

Fibers with a connector on the end make the process much simpler: The connector is simply plugged into a pre-aligned fiberoptic collimator, which contains a lens that is either accurately positioned with respect to the fiber, or is adjustable. To achieve the best injection efficiency into the optical fiber, the position and size of the spot and divergence of the beam must all be optimized. With suitable beams, well over 95% coupling efficiency can be achieved.

A problem with devices comprising an adjustable lens is that the accurate positioning required will also require a correspondingly accurate adjustment mechanism. For position control in more than one direction, multiple linear stages may be used together. A "two-axis" or "X-Y" stage can be assembled from two linear stages, one mounted to the platform of the other such that the axis of motion of the second stage is perpendicular to that of the first. A "three-axis" or "X-Y-Z" stage is composed of three linear stages mounted to each other such that the axes of motion of all stages are orthogonal. Some two-axis and three-axis stages are integrated designs rather than being assembled from separate single-axis stages.

An example of a fiber mounting system is shown in U.S. Pat. No. 5,351,330, wherein a lens assembly is supported by a lens holder. The lens holder is positioned by causing deformation to a set of connectors. A problem with this solution is that the deformation is permanent, making re-positioning impossible. Even if a re-positioning would be attempted, any subsequent deformation would weaken the connectors. Also, as the positioning requires deformation of the connectors, rapid or repeatable re-positioning is not possible.

US2003/123808 discloses a similar fiber mounting system in which symmetrical springs are used about a collar in a gimbal system to capture an assembly comprising a ball and an optical or other type of component. Once captured within the mounting system, the ball/component assembly can pivot until an optimal alignment is reached. Once the optimal alignment is reached, the ball/component assembly is fixed using laser welding. A problem with this solution is that the positioning is permanent, making re-positioning impossible.

Depending upon launch conditions and laser power, a misalignment of as little as a few micrometers can cause transmission losses of several hundred Watts in a high-power industrial laser system.

The necessity of having a two- or three-axis adjustment system results in a complicated mechanical design to allow this micrometer precision, however the complexity of the mechanical parts can result in a device that is sensitive to thermal changes or gradients in the system which are commonplace when dealing with high-power industrial lasers.

Hence, there is a need for an improved adjustable device that can be repeatedly re-positioned, rapidly and with high accuracy, but is less complicated and comprises fewer adjustable parts than current solutions.

SUMMARY OF THE INVENTION

The above problems are solved by an optoelectronic component.

In the subsequent text, the term "lens" is to be interpreted as comprising a single lens or a group of lens elements, where the lens has one focal point.

The invention relates to an optoelectronic component for receiving light, which component comprises a housing with an axially extending cavity arranged to receive an incoming beam. The component comprises at least one adjustable arrangement comprising a lens and a first adjustment means for adjusting the focal point of the lens relative to the end surface of an optical fiber connectable to the housing.

The adjustable arrangement further comprises a first body, arranged to influence said lens position, and a second body, contacting the first body and journalled in the housing. The first adjustment means is arranged to act on the first body to rotate the first body spherically around a distant point and to alter the position of the lens, in order to locate the focal point of the lens on the end surface of the optical fiber. The first body is connected to the journalled second body in such a way that an adjustment of the first body causes the first body and the second body to move together as a unit.

The first adjustment means is arranged to act on the first body, adjusting the first body in two orthogonal directions remote from the second body relative to the propagating axis of the beam associated with the lens. For this purpose, the first adjustment means comprises a first and a second adjustable device arranged at right angles to the propagating axis of the beam associated with the lens and to each other. The first and second adjustable devices are each fine-tuneable. An adjustment of either adjustable device in their respective directions, towards or away from the propagating axis of the beam will cause a corresponding adjustment of the lens supported by the first body.

The first and second adjustable devices comprise rotatable elements with threaded sections arranged to cooperate with the housing. In order to avoid any backlash during the adjustment, the first body is held in contact with each adjustable device by resilient means acting on the first body. The resilient means is preferably located in the same plane as the respective first and second adjustable device, at opposite sides thereof relative to the propagating axis of the beam.

As stated above, the second body is journalled in the housing which allows spherical rotation of the first body when acted upon by the adjustment devices. According to a first example, the second body comprises a spherical bearing. The spherical bearing is mounted in the cavity in the housing and is arranged to at least partially enclose the second body.

According to a second example, the second body comprises a universal joint, in the form of a gimbal or Cardan joint. A gimbal is a pivoted support that allows the rotation of an object about a single axis. A set of two gimbals, one mounted on the other with orthogonal pivot axes, with the outer mounted in the housing and the inner to the second body, can be used to allow the second body to be pivoted into any desired angle relative to the propagating axis of the beam. Adjustment can be carried out using a first and second adjustable devices acting on the first body, as described above.

The first adjustment means described above is arranged to locate the focal point of the lens on the end surface of the optical fiber in a plane at substantially right angles to the propagating axis of the optical fiber. Should this plane not coincide with the end surface of the optical fiber, then the focal point of the lens can end up in front of the end surface or inside the optical fiber. In order to correct this, the assembly comprising the first and the second body is arranged slidable relative to the first adjustment means along the propagating axis of the beam. The adjustable arrangement further comprises a second adjustment means for displacement of the arrangement along the propagation axis of the beam associated with the lens. The second adjustment means can comprise a screw or a rotatable section of the housing. The second adjustment means acts on the second body in order to adjust the position of the lens along the propagation axis of the beam.

In order to avoid any backlash during the adjustment, the second body is held in contact with the second adjustment means by a resilient element located between the second body and the housing, and arranged to act along the propagation axis. The second adjustment means is arranged on the opposite side of the second body relative to the resilient means and comprises a rotatable element with a threaded section arranged to cooperate with the housing. The second adjustment means can act directly or indirectly on the second body.

The optoelectronic component described above can be used in optical fiber systems or devices with one or more input fibers or one or several output fibers or a combination thereof. When used for an input fiber the component is arranged to receive incoming light and to allow adjustment of the focal point of the lens to ensure that the incoming beam is transmitted into the device with a minimum of losses. Similarly, when used for an output fiber the component is arranged to receive a collimated beam, a beam from a laser or similar, and to allow adjustment of the focal point of the lens to ensure that the output beam is transmitted into the fiber with a minimum of losses.

According to a first example, the optoelectronic component is a fiber-to-fiber coupler comprising at least one lens arranged to receive light from an optical fiber connectable to the housing and to focus the light into a second optical fiber.

According to a second example, the optoelectronic component is a fiber-to-fiber optic switch comprising a collimating lens arranged to receive light from an optical fiber, means for switching the collimated or near-collimated beam between one or more focusing lenses, where each focusing lens is provided with a focusing arrangement to focus the light into a second optical fiber.

According to a third example, the optoelectronic component comprises a source of light such as a laser emitting a beam of light to be transmitted to an optical fiber.

BRIEF DESCRIPTION OF DRAWINGS

In the following text, the invention will be described in detail with reference to the attached drawings. These schematic drawings are used for illustration only and do not in any way limit the scope of the invention. In the drawings.

EMBODIMENTS OF THE INVENTION

Figure 1:
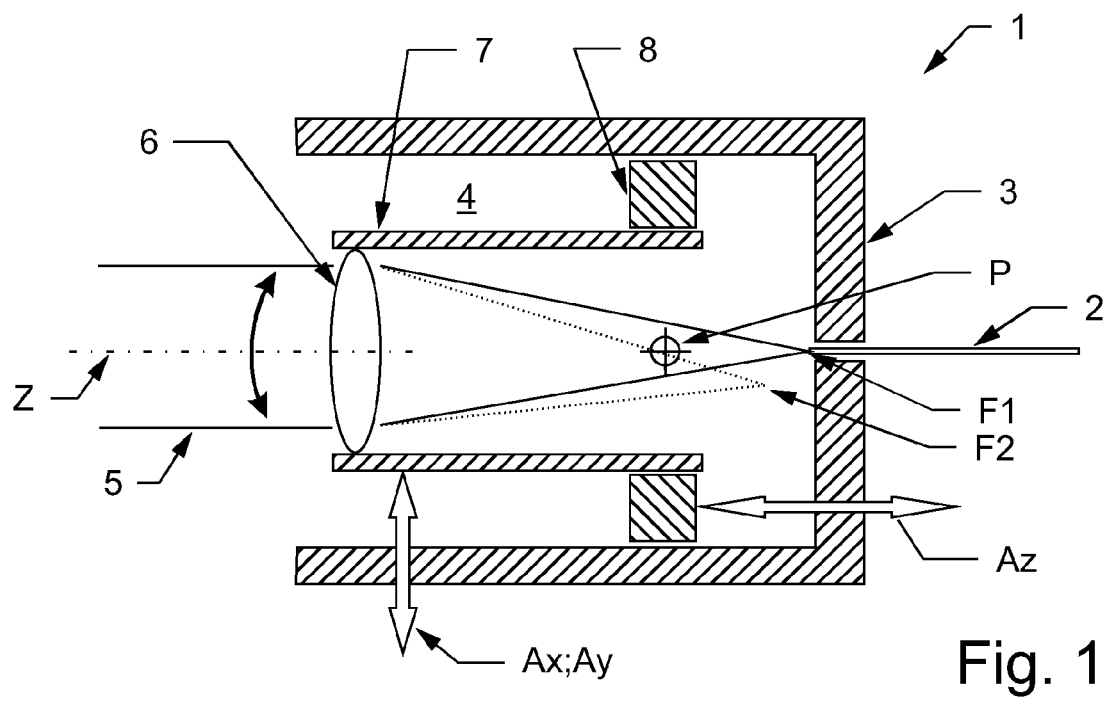
FIG. 1 shows a schematic cross-section of an optoelectronic component according to the invention.

FIG. 1 shows a schematic cross-section of an optoelectronic component 1 according to the invention. This figure illustrates the general principle of the invention, wherein the subsequent figures will show specific embodiments. The optoelectronic component, hereafter termed "component", is mounted on or fixed relative to a device for receiving light from an input fiber or transmitting light to an output fiber. Examples of such devices will be given below. When used with an input fiber, the component is arranged to receive a beam that passes through a lens in the component, into the device for processing. When used for an output fiber the component is arranged to receive light from a collimated beam or a source of light that passes through a lens, to be focused on the output fiber for further transmission.

The example of FIG. 1 will be described for the case where the component 1 is used with an output fiber 2. The component 1 comprises a housing 3 with an axially extending cavity 4 arranged to receive an incoming beam 5, in this example a collimated beam with a propagation axis Z associated with the lens. The component is provided with an adjustable arrangement comprising a lens 6, a first body 7 arranged to be displaceable to influence the position of the lens 6 and a second body 8 journalled about a point P in the housing 3. The first body 7 is attached to the second body 8 at one end and supports the lens 6 at a position remote from the first body 7. An adjustment of the first body 7 causes the adjustable arrangement to pivot about the point P and can rotate the lens supported by the first body spherically into a desired position.

The component 1 is provided with adjustment means (see FIG. 2) for adjusting the focal point of the lens 6 relative to the end surface of an optical fiber 2 connectable to the housing 3 by a suitable connector. Connectors of this type are known per se and will not be described in detail here. A first adjustment means is arranged to provide adjustment in two directions Ax, Ay (one shown in FIG. 1), which directions are orthogonal to each other and to the axis Z of the beam. A second adjustment means is arranged to provide adjustment in a direction Az along the axis Z of the incident beam 5.

In FIG. 1, the beam 5 is shown passing through the lens 6 where it is focused to a focal point F1 located precisely at the end surface of the transmitting fiber 2. However, a minor misalignment of any one part of the assembly can cause a misalignment of the beam (indicated in dashed lines) and a shift in its focal point F2. Note that the scale of the misalignment is exaggerated for clarity; in practice the displacement of the focal point in the x-/y-direction may be on the scale of micrometers. Such a misalignment can be corrected by a first adjustment in Ax and/or Ay directions, to center the focal point relative to the end of the fiber. If required, this can be followed by a second adjustment in the Az direction to shift the focal point F2 onto the end of the fiber.

The first adjustment means is arranged to act on the first body to rotate the first body spherically around a distant point P and to alter the position of the lens 6, in order to locate the focal point of the lens 6 on the end surface of the optical fiber 2, preferably within the core of the fiber. The first body 7 is connected to the journalled second body 8 in such a way that an adjustment of the first body 7 causes the first body 7 and the second body 8 to move together as a unit.

Figure 2:
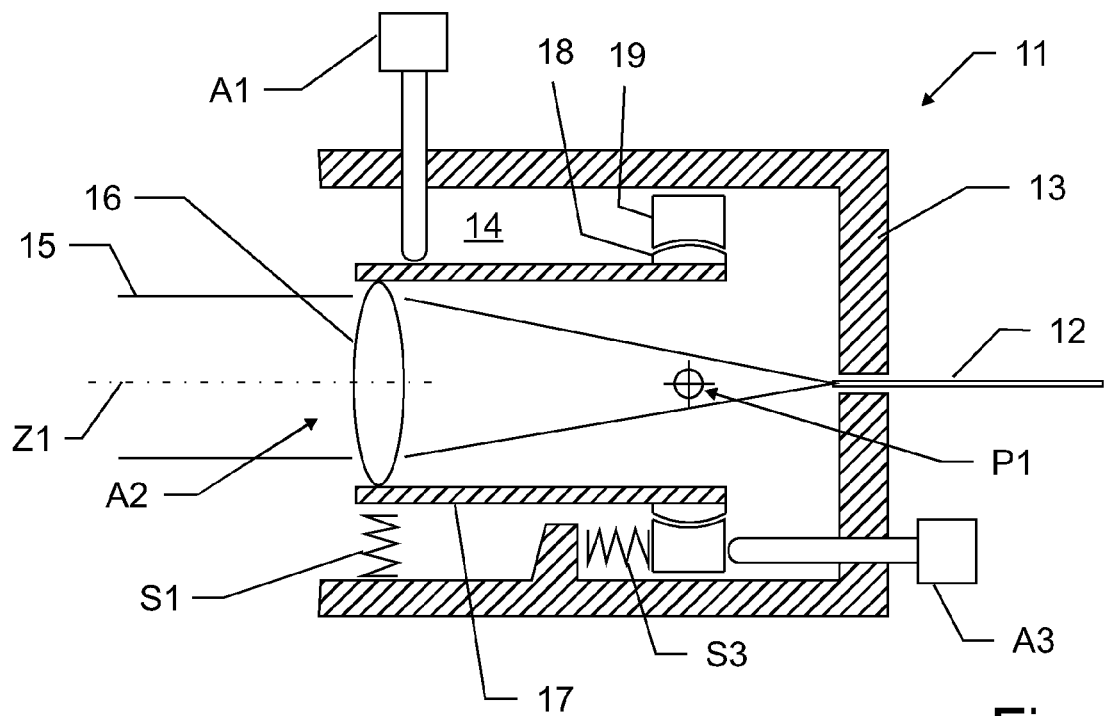
FIG. 2 shows a schematic first embodiment of the component in FIG. 1.

FIG. 2 shows a schematic first embodiment of the component in FIG. 1. As in FIG. 1, the component 11 comprises a housing 13 with an axially extending cavity 14 arranged to receive an incoming beam 15, in this example a collimated beam with a propagation axis Z1 associated with the lens. The component is provided with an adjustable arrangement comprising a lens 16, a first body 17 arranged to be displaceable to influence the position of the lens 16 and a second body 18 journalled about a point P1 in the housing 13. The first body 17 is attached to the second body 18 at one end and supports the lens 16 at a position remote from the first body 17. In this embodiment, the second body 18 is enclosed by a spherical bearing 19 which can be swiveled about the point P1.

A first adjustment means is arranged to act on the first body 17, allowing for adjustment of the first body in two orthogonal directions remote from the second body relative to the propagating axis of the beam associated with the lens. For this purpose, the first adjustment means comprises a first and a second adjustable device A1, A2 arranged at right angles to the propagating axis Z1 of the beam 15 associated with the lens and to each other. The first and second adjustable devices A1, A2 are each fine-tunable. An adjustment of either adjustable device in their respective directions, towards or away from the propagating axis of the beam, will cause a corresponding adjustment of the lens supported by the first body. An example of a suitable adjustable device for this purpose is an actuator in the form of a differential adjuster screw, for instance, with an accuracy of 25 micrometers/rev.

In order to avoid any backlash during the adjustment of any one of the first and second adjustable devices A1, A2, the first body 17 is held in contact with each adjustable device A1, A2 by resilient means acting on the first body 17. The resilient means are located in the same plane as the respective first and second adjustable device, at opposite sides thereof relative to the propagating axis of the beam. In FIG. 2, a resilient means in the form of a spring S1 (only one shown) is indicated opposing the first adjustable device A1.

The adjustable arrangement further comprises a second adjustment means for displacement of the arrangement along the propagation axis Z1 of the beam 15 associated with the lens 16. The second adjustment means comprises a third adjustment device A3 that is indicated as a screw. Alternative solutions can comprise a rotatable section of the housing, an annular fluid or electrically actuated piston, an internal rotatable element controlled by threads or cooperating wedges, or similar adjustable devices for displacing the second body 18. In the embodiment shown in FIG. 2, the third adjustment device A3 is located parallel to the propagation axis Z1 and is arranged to act on a radially outer portion of the spherical bearing 19.

In order to avoid any backlash during the adjustment of the third adjustment device A3, the second body 18 and the spherical bearing 19 is held in contact with the third adjustment device A3 by a resilient means acting on the second body 18 and the spherical bearing 19. The resilient mean is located at the opposite side of the second body 18 and the spherical bearing 19 in the direction of the propagating axis of the beam. In FIG. 2, a schematic resilient means in the form of a spring S3 (only one shown) is indicated opposing the third adjustable device A3. The spring S3 is mounted against a schematically indicated stop in the housing 13. In practice, such a spring could comprise an annular stack of springs surrounding the first body.

Figure 3:
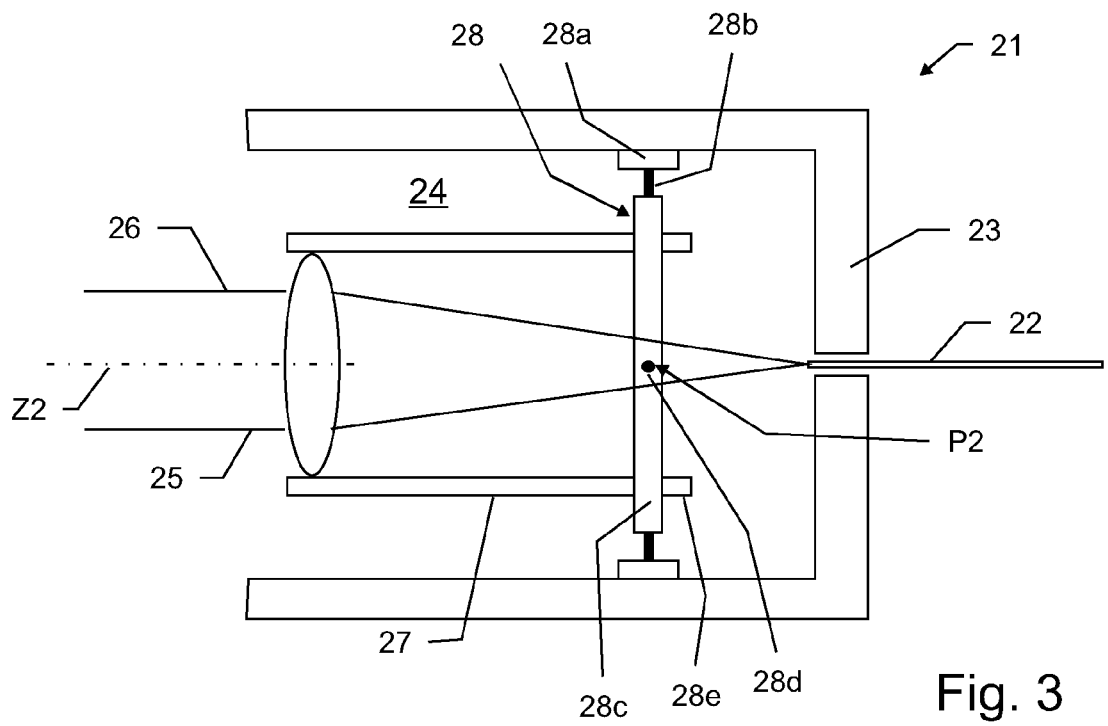
FIG. 3 shows a schematic second embodiment of the component in FIG. 1.

FIG. 3 shows a schematic second embodiment of the component in FIG. 1. As in FIG. 1, the component 21 comprises a housing 23 with an axially extending cavity 24 arranged to receive an incoming beam 25, in this example a collimated beam with a propagation axis Z2 associated with the lens. The component is provided with an adjustable arrangement comprising a lens 26, a first body 27 arranged to be displaceable to influence the position of the lens 26 and a second body 28 journalled about a point P2 in the housing 23. The first body 27 is attached to the second body 28 at one end and supports the lens 26 at a position remote from the first body 27. In this embodiment, the second body 28 comprises a gimbal that allows the first body 27 to be swiveled about the point P2. The gimbal making up the second body 28 comprises an outer, first ring 28a which is mounted slidable relative to the housing 23 to allow the second body 28 to be displaced along the propagation axis Z2. The first ring 28a supports two diametrically opposite and coinciding first axles 28b which support a second, intermediate ring 28c.

The second ring 28c supports two diametrically opposite and coinciding second axles 28d which support a third, inner ring 28e. The first and second axles 28b, 28d are arranged at right angles to each other and are located in a plane that intersects the point P2 at right angles to the propagation axis Z2 of the beam. The first body 27 is attached to the inner ring 18e, which allows it to be adjusted in a spherical plane relative to the point P2.

The assembly comprising the first and second body 27, 28 is provided with a first and a second adjustment means (not shown), as described above in connection with FIG. 2. The embodiment of FIG. 3 can be provided with the same first and second adjustable devices arranged at right angles to the propagating axis Z2 of the beam 25 associated with the lens 26 and to each other. This allows the gimbal supported first body 27 to be adjusted in the x- and y-directions. Also, a second adjustment means (not shown) is provided for displacement of the arrangement in the z-direction along the propagation axis Z2 of the beam 25 associated with the lens 26. The second adjustment means comprises a third adjustment device arranged to act on the outer ring 28a of the second body 28.

Figure 4:
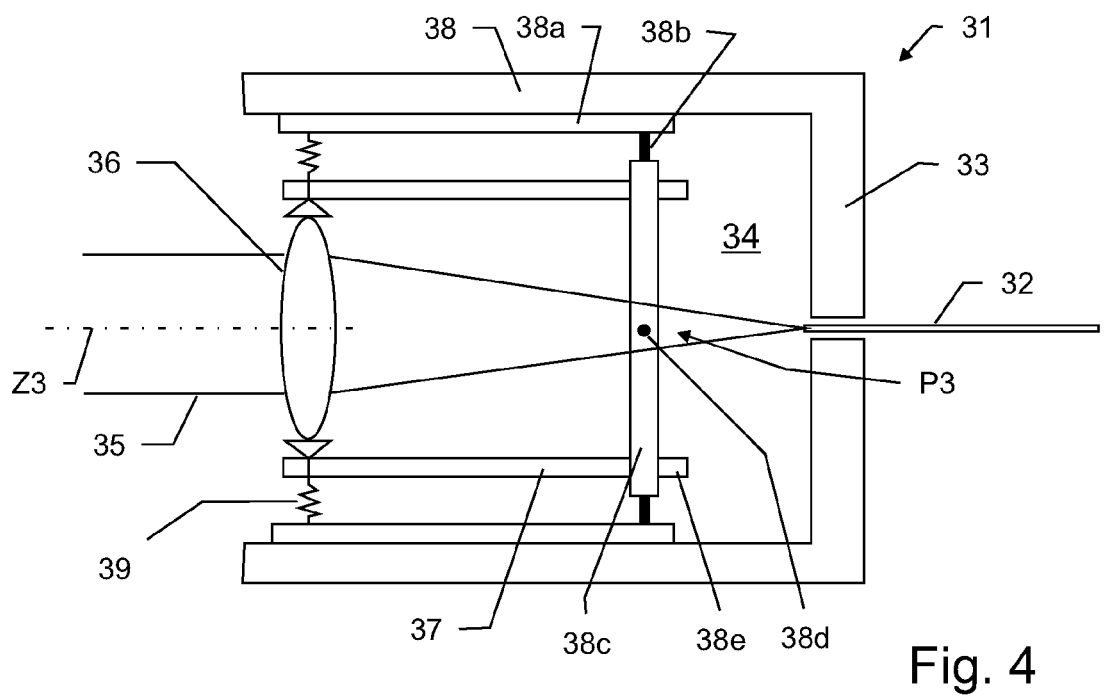
FIG. 4 shows a schematic third embodiment of the component in FIG. 1.

FIG. 4 shows a schematic third embodiment of the component in FIG. 1. This embodiment is a variant of the solution described in FIG. 3 above. As in FIG. 1, the component 31 comprises a housing 33 with an axially extending cavity 34 arranged to receive an incoming beam 35, in this example a collimated beam with a propagation axis Z3 associated with the lens. The component is provided with an adjustable arrangement comprising a lens 36, a first body 37 arranged to be displaceable to influence the position of the lens 36 and a second body 38 journalled about a point P3 in the housing 33. The first body 37 is attached to the second body 38 at one end and supports the lens 36 at a position remote from the first body 37. In this embodiment, the second body 38 comprises a gimbal that allows the first body 37 to be swiveled about the point P3. The gimbal making up the second body 38 comprises an outer, first ring 38a which is mounted slidable relative to the housing 33 to allow the second body 38 to be displaced along the propagation axis Z3. The first ring 38a supports two diametrically opposite and coinciding first axles 38b which support a second, intermediate ring 38c. The second ring 38c supports two diametrically opposite and coinciding second axles 38d which support a third, inner ring 38e. The first and second axles 38b, 38d are arranged at right angles to each other and are located in a plane that intersects the point P2 at right angles to the propagation axis Z2 of the beam. The first body 37 is attached to the inner ring 18e, which allows it to be adjusted in a spherical plane relative to the point P2.

The embodiment of FIG. 4 differs from that in FIG. 3 in that the outer, first ring 38a comprises a cylindrical body that surrounds the first body 37 over at least a major portion of its axial extension. The entire outer, first ring 38a is mounted slidable relative to the housing 33 to allow the second body 38 to be displaced. The lens 36 is supported by the outer, first ring 38a by means of resilient elements 39, such as springs, in at least three evenly distributed locations around the lens 26. The first body 37 is in contact with the outer periphery of the lens 36 in at least three locations, wherein an adjustment of the first body causes an adjustment of the lens 36.

The assembly comprising the first and second body 37, 38 is provided with a first and a second adjustment means (not shown), as described above in connection with FIG. 2. The embodiment of FIG. 4 can be provided with the same first and second adjustable devices arranged at right angles to the propagating axis Z2 of the beam 35 associated with the lens 36 and to each other. This allows the gimbal supported first body 37 to be adjusted in the x- and y-directions. Also, a second adjustment means (not shown) is provided for displacement of the arrangement in the z-direction along the propagation axis Z2 of the beam 35 associated with the lens 36. The second adjustment means comprises a third adjustment device arranged to act on the outer ring 38a of the second body 38.

Figure 5:
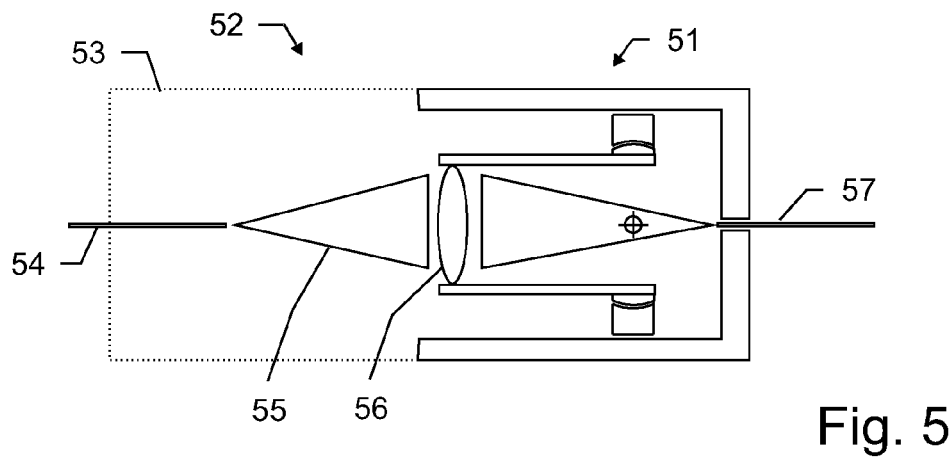
FIG. 5 shows a component according to the invention arranged in a basic fiber-to-fiber coupler.

FIG. 5 shows a component 51 according to FIG. 2 arranged in a basic fiber-to-fiber coupler 52. In this example the basic fiber-to-fiber coupler 52 comprises a housing 53 (indicated in dashed lines) with a connector (not shown) for a receiving fiber 54. The component 51 is attached to the output side of the basic fiber-to-fiber coupler 52. A received beam 55 is transmitted from the receiving fiber 54 to a focusing lens 56 in the component 51 and is focused onto the end of a transmitting fiber 57 attached by a connector (not shown) to the component 51. The general procedure for adjustment of the focal point of the focusing lens 56 onto the transmitting fiber 57 has been described in connection with FIGS. 1 and 2 above.

Figure 6:
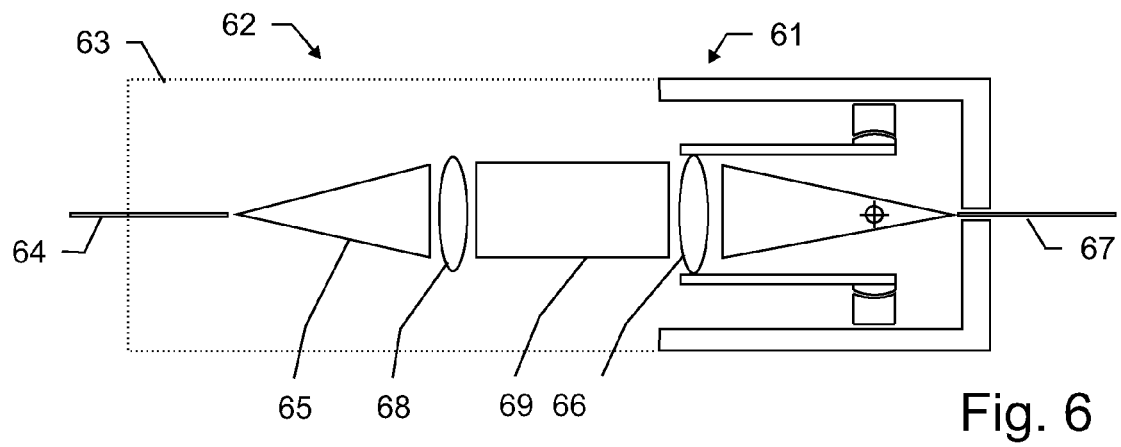
FIG. 6 shows a component according to the invention arranged at the output end of a fiber-to-fiber coupler.

FIG. 6 shows a component 61 according to FIG. 2 arranged in an alternative fiber-to-fiber coupler 62. In this example the fiber-to-fiber coupler 62 comprises a housing 63 (indicated in dashed lines) with a connector (not shown) for a receiving fiber 64. The component 61 is attached to the output side of the fiber-to-fiber coupler 62. A received beam 65 is transmitted from the receiving fiber 64 to a collimating lens 68. A collimated beam 69 is transmitted to a focusing lens 66 in the component 61 and is focused onto the end of a transmitting fiber 67 attached by a connector (not shown) to the component 61. The general procedure for adjustment of the focal point of the focusing lens 66 onto the transmitting fiber 67 has been described in connection with FIGS. 1 and 2 above.

Figure 7:
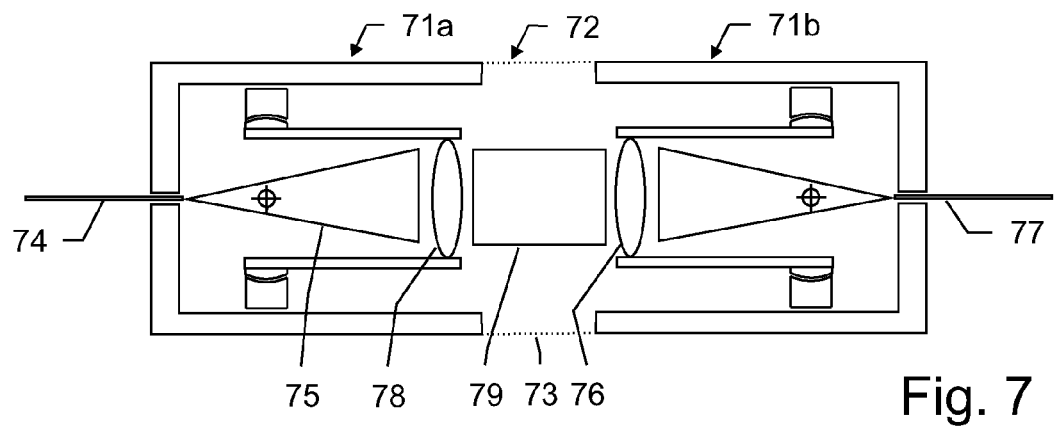
FIG. 7 shows a component according to the invention arranged at the input and output ends of a fiber-to-fiber coupler.

FIG. 7 shows a pair of components 71a, 71b according to FIG. 2 arranged in a further alternative fiber-to-fiber coupler 72. In this example the fiber-to-fiber coupler 72 comprises a housing 73 (indicated in dashed lines) with a connector (not shown) for a receiving fiber 74. Identical components 71a, 71b are attached to the input and the output side of the fiber-to-fiber coupler 72. A received beam 75 is transmitted from the receiving fiber 74 to a collimating lens 78 in the input side component 71a. A collimated beam 79 is transmitted to a focusing lens 76 in the output side component 71b and is focused onto the end of a transmitting fiber 77 attached by a connector (not shown) to the component 71b. The general procedure for adjustment of the focal point of the collimating lens and the focusing lens 76 onto the ends of the receiving fiber 74 and the transmitting fiber 77, respectively, has been described in connection with FIGS. 1 and 2 above.

Figure 8:
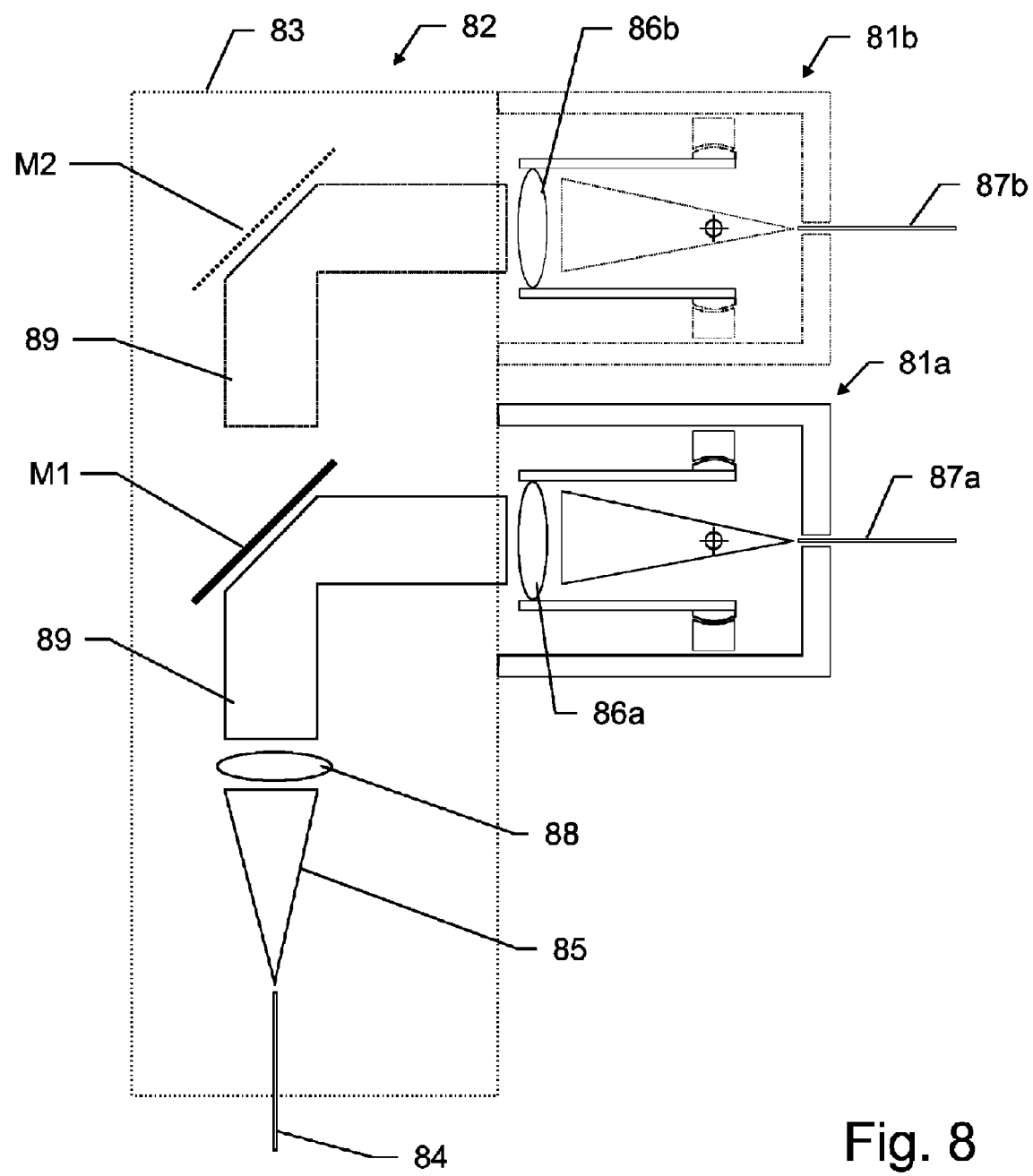
FIG. 8 shows a component according to the invention arranged in a fiber-to-fiber switch.

FIG. 8 shows a pair of components 81a, 81b according to FIG. 2 arranged in a fiber-to-fiber switch 82. In this example the fiber-to-fiber switch 82 comprises a housing 83 (indicated in dashed lines) with a connector (not shown) for a receiving fiber 84. Identical components 81a, 81b are attached to separate output sides of the fiber-to-fiber switch 82. A received beam 85 is transmitted from the receiving fiber 84 to a collimating lens 88 in the fiber-to-fiber switch 82. A collimated beam 89 is transmitted via a first mirror M1 to a focusing lens 86a in a first output side component 81a and is focused onto the end of a first transmitting fiber 87a attached by a connector (not shown) to the first component 81a. In order to switch the beam 85, the first mirror M1 is removed from the beam path. The collimated beam 89 is then transmitted via a second mirror M2 (shown in dashed lines) to a focusing lens 86b in a second output side component 81b and is focused onto the end of a second transmitting fiber 87b attached by a connector (not shown) to the second component 81b. The function of the mirrors used in a fiber-to-fiber switch of this type is well known and will not be described in detail here. In this example, a switch comprising a receiving fiber with two parallel transmitting fibers arranged at 90° to the receiving fiber is shown. However, a switch of this type is not limited to this arrangement, as it can comprise multiple components according to the invention and where the components can be arranged to exit the switch in any desired direction and/or angle. The general procedure for adjustment of the focal point of the respective focusing lenses 86a, 86b onto the transmitting fibers 87*a*, 87*b*, respectively, has been described in connection with FIGS. 1 and 2 above.

Figure 9:
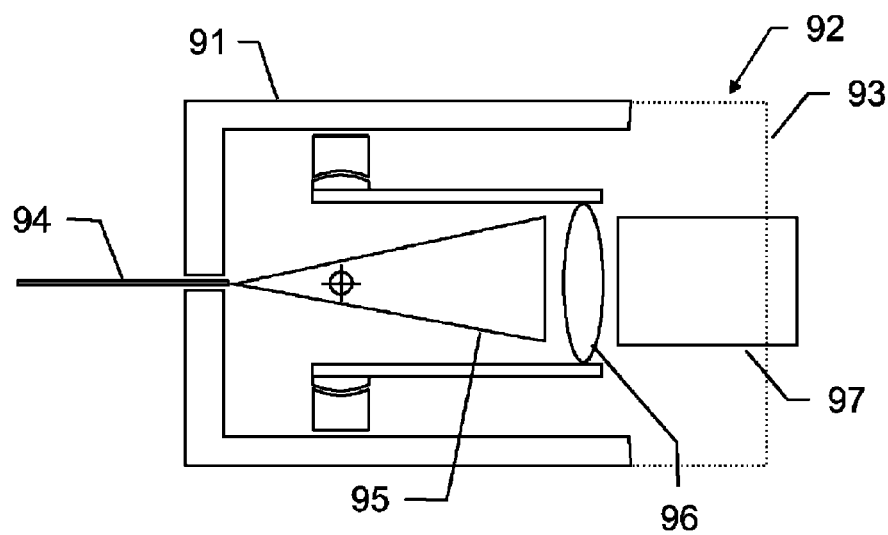
FIG. 9 shows a component according to the invention arranged at the input end of a collimating unit.

FIG. 9 shows a component 91 according to FIG. 2 arranged at the end of a collimating unit 92. In this example the collimating unit 92 comprises a housing 93 (indicated in dashed lines) with a connector (not shown) for a receiving fiber 94. The component 91 in FIG. 9 is attached to the input side of the collimating unit 92. A received beam 95 is transmitted from the receiving fiber 94 to a collimating lens 96 in the component 91 and the focal point of the collimating lens 96 is located onto the end of the receiving fiber 94. The collimated beam 97 can be transmitted to any suitable subsequent optical unit. The general procedure for adjustment of the focal point of the collimating lens 96 onto the receiving fiber 94 has been described in connection with FIGS. 1 and 2 above.

Figure 10:
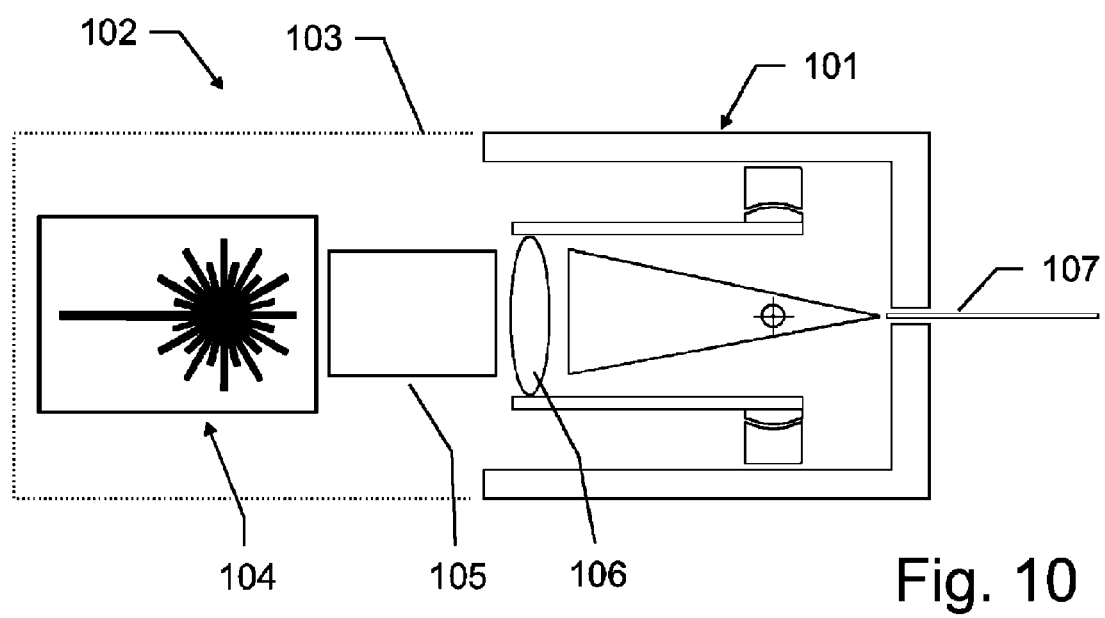
FIG. 10 shows a component according to the invention arranged at the output end of a fiber coupling unit comprising a light source.

FIG. 10 shows a component 101 according to FIG. 2 arranged in a fiber coupling unit 102 comprising a light source. In this example the fiber coupling unit 102 comprises a housing 103 (indicated in dashed lines) with a light source 104, in this case in the form of a laser. The component 101 is attached to the output side of the fiber coupling unit 102. A beam 105 from the light source 104 is transmitted to a focusing lens 106 in the component 101 and is focused onto the end of a transmitting fiber 107 attached by a connector (not shown) to the component 101. The procedure for adjustment of the focal point of the focusing lens 106 onto the transmitting fiber 107 has been described in connection with FIGS. 1 and 2 above.

The above embodiments have been described with reference to the component shown in FIG. 2. However, any one of the units described in FIGS. 1-4 can be used in the embodiments of FIGS. 5-10 above.

The invention is not limited to the above embodiments, but may be varied freely within the scope of the claims.

The invention claimed is:

1. An optoelectronic component for receiving light, the component comprising:
    a housing comprising an axially extending cavity arranged to receive an incoming beam;
    at least one adjustable arrangement comprising at least one lens, and a first adjustment module configured to adjust a focal point of said lens relative to an end surface of an optical fiber connectable to the housing;
    a first body supporting the lens and influencing a position of the lens;
    a second body contacting the first body and journalled about a point in the housing distant from the lens;
    wherein the first adjustment module is arranged to act on the first body remote from the second body, and to angularly adjust an axis of the first body in two orthogonal directions relative to an axis of the housing to rotate the first body spherically around a distant point to alter the position of said lens relative to the end surface of the optical fiber, in order to locate the focal point of the lens on the end surface of the optical fiber.

2. The component according to claim 1, wherein the first adjustment module comprises a first and a second adjustable device arranged at right angles to a propagating axis of the beam associated with the lens, and to each other.

3. The component according to claim 2, wherein the first and second adjustable devices are each adjustable in a plane coinciding with the propagating axis of the beam.

4. The component according to claim 2, wherein the first and second adjustable devices comprise rotatable elements with threaded sections arranged to cooperate with the housing.

5. The component according to claim 1, further comprising:
    a resilient member acting on the second body and configured to hold the first body in contact with each adjustable device.

6. The component according to claim 1, wherein the second body comprises a spherical bearing.

7. The component according to claim 1, wherein the second body comprises a universal joint.

8. The component according to claim 1, wherein the second body is arranged slidable relative to the first adjustment module along an axis of the beam.

9. The component according to claim 1, further comprising:
    a second adjustment module configured to displace the adjustable arrangement along a propagation axis of the beam associated with the lens.

10. The component according to claim 9, further comprising:
    a resilient element configured to hold the second body in contact with the second adjustment module, wherein the resilient element is located between the second body and the housing, and arranged to act along the propagation axis.

11. The component according to claim 9, wherein the second adjustment module comprises a rotatable element with a threaded section arranged to cooperate with the housing.

12. The component according to claim 1, wherein the optoelectronic component is a fiber-to-fiber coupler comprising at least one lens arranged to receive light from an optical fiber connectable to the housing and to focus the light into a second optical fiber.

13. The component according to claim 1, wherein the optoelectronic component is an optic switch comprising a collimating lens arranged to receive light from an optical fiber, a switching module configured to switch the collimated or near-collimated beam between at least one focusing lens, where each focusing lens comprises a focusing arrangement.

14. The component according to claim 1, further comprising:
    a source of light.

* * * * *